(12) United States Patent
Cooper

(10) Patent No.: US 10,808,998 B1
(45) Date of Patent: Oct. 20, 2020

(54) NATURAL GAS DRYING METHOD AND APPARATUS

(71) Applicant: James Benton Cooper, Greenwood, AR (US)

(72) Inventor: James Benton Cooper, Greenwood, AR (US)

(*) Notice: Subject to any disclaimer, the term of this patent is extended or adjusted under 35 U.S.C. 154(b) by 152 days.

(21) Appl. No.: 15/911,817

(22) Filed: Mar. 5, 2018

Related U.S. Application Data

(60) Provisional application No. 62/466,425, filed on Mar. 3, 2017.

(51) Int. Cl.
| | | |
|---|---|---|
| *B01D 53/02* | (2006.01) | |
| *F25J 3/02* | (2006.01) | |
| *B01D 53/04* | (2006.01) | |
| *B01D 53/26* | (2006.01) | |
| *B01D 53/28* | (2006.01) | |

(52) U.S. Cl.
CPC .......... *F25J 3/0209* (2013.01); *B01D 53/04* (2013.01); *B01D 53/261* (2013.01); *B01D 53/28* (2013.01); *B01D 2257/80* (2013.01)

(58) Field of Classification Search
CPC ...... F25J 3/0209; B01D 53/04; B01D 53/261; B01D 53/28; B01D 2257/80
See application file for complete search history.

(56) References Cited

U.S. PATENT DOCUMENTS

| | | | |
|---|---|---|---|
| 3,024,867 A | 3/1962 | Milton | 183/114.2 |
| 4,076,776 A * | 2/1978 | Moore | B01J 2/06 264/13 |
| 4,661,130 A * | 4/1987 | Ebeling | B01D 53/263 261/114.2 |
| 5,364,540 A * | 11/1994 | Sciuto | F25B 43/003 210/266 |
| 5,725,637 A | 3/1998 | Gavlin et al. | 95/231 |
| 9,255,731 B2 | 2/2016 | Prim et al. | 62/617 |
| 2008/0148937 A1* | 6/2008 | Rege | B01D 53/047 95/96 |

\* cited by examiner

*Primary Examiner* — Christopher P Jones
(74) *Attorney, Agent, or Firm* — Keisling & Pieper PLC; Trent C. Keisling; David B. Pieper

(57) ABSTRACT

A process and apparatus for dehydrating a wet natural gas feed stream using an inline passive dehydration tower containing a tray supporting a distribution bed of ceramic beads followed by a drying bed of calcium chloride prills that provides a dried outlet gas stream and a waste water outlet.

1 Claim, 1 Drawing Sheet

NATURAL GAS DRYING METHOD AND APPARATUS

CROSS-REFERENCE TO RELATED APPLICATIONS

This application claims priority to and is a continuation-in-part of U.S. Provisional Application Ser. No. 62/466,425, filed on Mar. 3, 2017 by James Benton Cooper entitled Natural Gas Drying Method and Apparatus. This prior application is incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to a natural gas drying method and apparatus. More particularly, the invention relates to a process and apparatus that uses a vessel with an internal distribution bed of ceramic beads and a drying bed of calcium chloride prills. Known art may be found in U.S. Class 1, subclass 1 and U.S. Class 95, subclass 231, as well as other classes and subclasses.

2. Description of the Known Art

As will be appreciated by those skilled in the art, removing water from natural gas is important to the industry. Known art adsorption systems employing large hygroscopic briquettes fail to dehydrate gasses consistently and adequately and were otherwise unsatisfactory. Patents disclosing information relevant to natural gas drying include the following United States patents, the teachings of which are hereby expressly incorporated by reference in their entirety.

U.S. Pat. No. 3,024,867, issued to Milton on Nov. 30, 1959. This patent relates to the drying of natural gas, and more specifically relates to an improved process for dying a natural gas stream by contact with an adsorbent material. This patent is directed to gels and not calcium chloride prills.

U.S. Pat. No. 5,725,637, issued to Gavlin, et al. on Mar. 10, 1998, and entitled Gas dehydration process. This patent is for a process for dehydrating gaseous fluids, such as natural gas, in which the gaseous fluid is contacted with a dehydrating composition having a glycol and a dissolved salt of at least one alkali metal carboxylate. The glycol is preferably ethylene glycol, diethylene glycol, triethylene glycol and mixtures thereof. The dissolved salt preferably constitutes up to about 33% by weight of the dehydrating composition. This process uses a liquid and not calcium chloride prills.

U.S. Pat. No. 9,255,731, issued to Prim, et al. on Feb. 9, 2016, entitled Sour NGL stream recovery. This patent is for a method for recovering a sour natural gas liquids strea. In one embodiment, a carbon dioxide recycle stream that comprises carbon dioxide, natural gas liquids, and acid gas is received. The carbon dioxide recycle stream is separated into a purified carbon dioxide recycle stream and a natural gas liquids stream. The purified carbon dioxide recycle stream comprises the carbon dioxide, and the natural gas liquids stream comprises the natural gas liquids and the acid gas. In another embodiment, a system comprises piping and a separator. The piping is configured to receive a recycle stream that comprises an injection gas, natural gas liquids, and acid gas. The separator is configured to separate the recycle stream into a purified recycle stream and a natural gas liquids stream. The purified recycle stream comprises the injection gas, and the natural gas liquids stream comprises the natural gas liquids and the acid gas. This method does not use calcium chloride prills.

From these known references it may be seen that these prior patents are very limited in their teaching and utilization, and an improved method and apparatus for drying natural gas is needed to overcome these limitations. Also, commercially available equipment and components may be relevant, including commercial treatment vessels, pumps, filters, piping, and the like. Such equipment may be used in implementing an exemplary embodiment in accordance with the present invention. None of these references, either singly or in combination, disclose or suggest the present invention.

SUMMARY OF THE INVENTION

The present invention is directed to a process and apparatus for dehydrating a wet gas feed stream uses an inline passive dehydration tower containing a tray supporting a distribution bed of ceramic beads followed by a drying bed of calcium chloride prills that provides a dried outlet gas stream and a waste water outlet.

One object of the present invention is to provide an easily used process and apparatus for drying gas.

Another object is to provide an improved process for drying natural gas using calcium chloride prills.

A still further object of the present invention is to provide an improved structure that uses calcium chloride prills to dry gas.

It is another object to provide an improved vessel housing a distribution layer of ceramic beads and drying prills for drying water from a natural gas.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
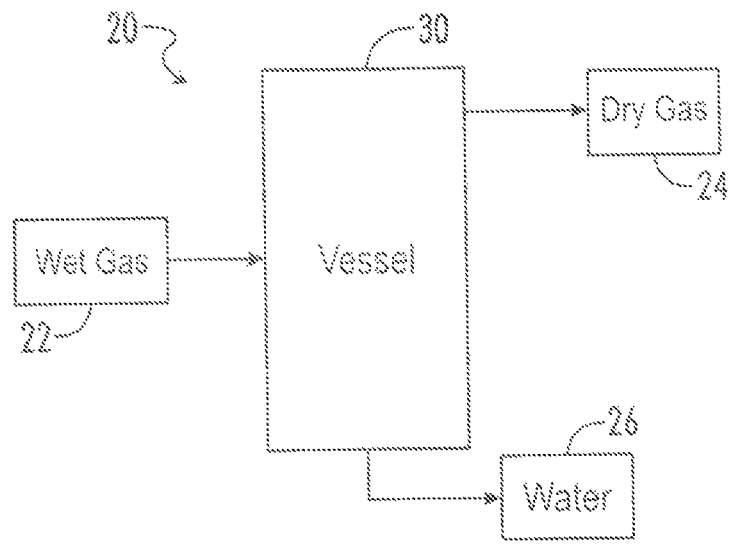
FIG. 1 is a process diagram in accordance with the present invention.
Figure 2:
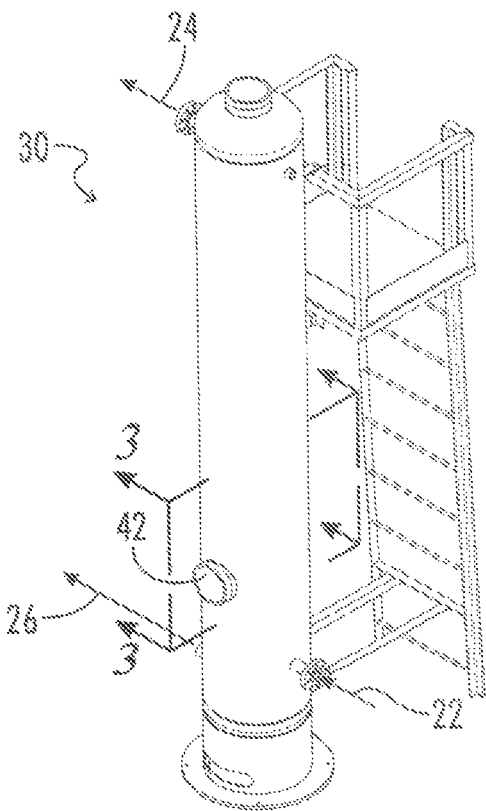
FIG. 2 is a side elevational view of a vessel in accordance with an exemplary embodiment of the present invention; and, FIG. 3 is a sectional view along line 3-3 of FIG. 2 and showing the internal arrangement of the beds and plate inside the vessel.
Figure 3:
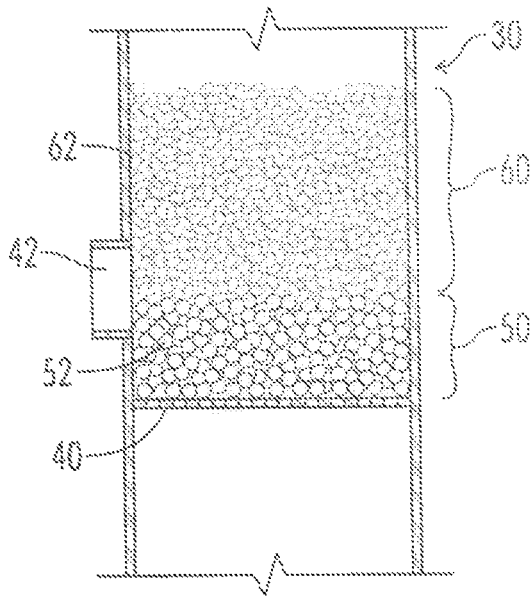

As shown in FIGS. 1-3 of the drawings, a method and apparatus for drying natural gas is generally indicated by arrow 20. The present process dehydrates a natural gas feed stream 22 using an inline passive dehydration tower 30 containing a distribution bed of inert ceramic beads 50 followed by a stacked bed of calcium chloride prills 60 (i.e. small beads) to produce an outlet dry gas stream 24 and waste water stream 26.

As mentioned above, known art systems employing large briquettes fail to dehydrate gasses consistently and adequately and were otherwise unsatisfactory. The size of the calcium chloride bed particles is important because increasing surface area increases the treatment area for dehydration.

The use of small calcium chloride prills increases surface area and requires less calcium chloride to dry a given volume of gas and thus makes the process more efficient. The resultant decreased calcium chloride requirement also leads to a smaller treatment vessel (i.e. a shorter tower height), which is also beneficial to initial capital costs, and in addition, access to relatively small and short towers can be accomplished with a ladder or walkway configuration, which simplifies operational control and maintenance.

In one exemplary embodiment, the vessel 30 comprises a vertical tower with a stainless steel product tray 40 that supports a distribution bed 50 and the calcium chloride ($CaCl_2$)) prill bed 60. The inlet gas pipeline 22 is usually a pipe with a diameter of between one inch and four feet that supplies wet gas at an elevated pressure (normally above 50 psi) to be dried.

The vessel size is application specific but has flexibility with a range of pressures and volumes desired to be processed. In some cases, the vessel 30 may be as small as twelve inches in diameter and four feet in height while in other cases a significantly larger diameter and/or height may be required.

The distribution bed 50 (i.e. ½" inch ceramic beads) forces the entering wet gas stream to spread out across the entire bottom of the subsequent prill stack 60 to evenly distribute flow as the wet gas contacts the calcium chloride.

In one exemplary embodiment, the stainless steel support and diffusion tray 40 is located up from the vessel bottom 35. A distribution bed 50 is supported by the tray and the bed 50 has a thickness of approximately five inches. The vessel bottom clean out access hatch 42 is placed 6" above the support tray 40 so the 5" bed 50 of ceramic beads 52 will remain in place during service wash outs. The ceramic beads 52 are not consumed during the process. In general, easy access fill nozzles and cleanouts make this vessel operator friendly.

Each prill 62 has roughly a spherical shape with a diameter of approximately 1-20 mm. In some embodiments, the prill bed 60 has a depth of between twelve inches and twenty feet and a diameter commensurate with the interior diameter of the vessel 30 and in one exemplary embodiment the vessel 30 has a diameter of twenty inches. In one exemplary embodiment, the prills have a diameter of approximately 0.25 inches. The desiccant prills may be placed in a vertical vessel through service openings in the vessel top or at other suitable locations in the vessel.

As inlet wet natural gas enters the vessel below the support plate, free liquids drop out into a sump (FIGS. 1-3). As wet gas flows upward it is diffused by the distribution support plate and ceramic beads and it then encounters the bed of prills resting immediately above.

The prills hydrate to remove water vapor from the gas stream. This water accumulates on the prill surface, and drips off the prill into the sump as the hygroscopic brine on the prill surface continues to remove water vapor from the gas. This process, known as "deliquescing", causes desiccant salts to dissolve into the fresh water accumulating on the prill. Prills are hence consumed at a rate based on the dilution factor of each formulation.

One pound of each desiccant will remove a certain mass of water vapor from gas. A higher dilution rate indicates that each pound of desiccant removes more water. In one exemplary embodiment, the use of calcium chloride prills will produce a dilution rate of at least four to one.

Generally, more hygroscopic desiccants have higher dilution rates. Gas exiting the vessel top has been dried to a point consistent with the equilibrium point of each desiccant (i.e. calcium chloride). Selection of the amount of prills is based on the inlet gas conditions and the required outlet moisture content. If drier outlet gas is desired, it is normally more economical to use several vessels in series, flowing from wettest to driest in separate vessels, rather than simply using an overly large quantity of desiccant in one vessel.

As prills are consumed new prills must be added periodically by isolating and depressurizing the vessel, removing the top service closure, and pouring new prills into the vessel. This interval is predictable, and if necessary, the vessel is simply oversized to provide a longer interval between service operations.

Water removed from the gas combines with salts in the prills to form brine water, which accumulates in the sump at the bottom of the vessel and exits via outlet pipe 70. This brine is removed (typically by automatic controllers) to brine storage where it can normally be disposed of as common oilfield brine. There are no other byproducts or emissions. Prills are typically not affected by high BTU gas, however inlet gas should flow through standard fluid knockouts, filters, or separators as required in any dehydration process design. The brine byproduct is not corrosive unless oxygen is present in the gas. No additional corrosion allowance is required for gas streams without oxygen.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action.

Apparatus claims may be recognized by the use of the word 'apparatus' in the preamble of the claim and should not be interpreted to have 'means plus function language' unless the word 'means' is specifically used in the claim element. The words 'defining.' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A tower for drying natural gas comprising:

a hollow elongated cylindrical tower with a spaced apart bottom and top adapted to receive a wet natural gas stream containing water at an inlet proximate the bottom and to produce a dried natural gas stream at an outlet proximate the top;

a grill adapted to support a packed bed with a depth extending from above the inlet and below the outlet; and, a packed bed containing a multitude of an inert ceramic beads forming a first stage with a constant depth and supporting an elongated second stage with a depth that decreases over time with exposure to water and having a multitude of discrete desiccants adapted to remove water from the wet natural gas to provide a dried natural gas proximate the outlet and a collected quantity of water at the bottom of the tower and wherein the discrete desiccants further comprise a multitude of individual prills formed from calcium chloride and each prill has an approximate initial diameter of at least 0.25 inches and wherein the tower has a diameter of at least twenty inches and the first stage is approximately five inches in depth and the second stage is initially between at least twelve inches and twenty feet in depth.

* * * * *